W. RALPH.
Cheese Vat.
No. 45,076.
Patented Nov. 15, 1864.
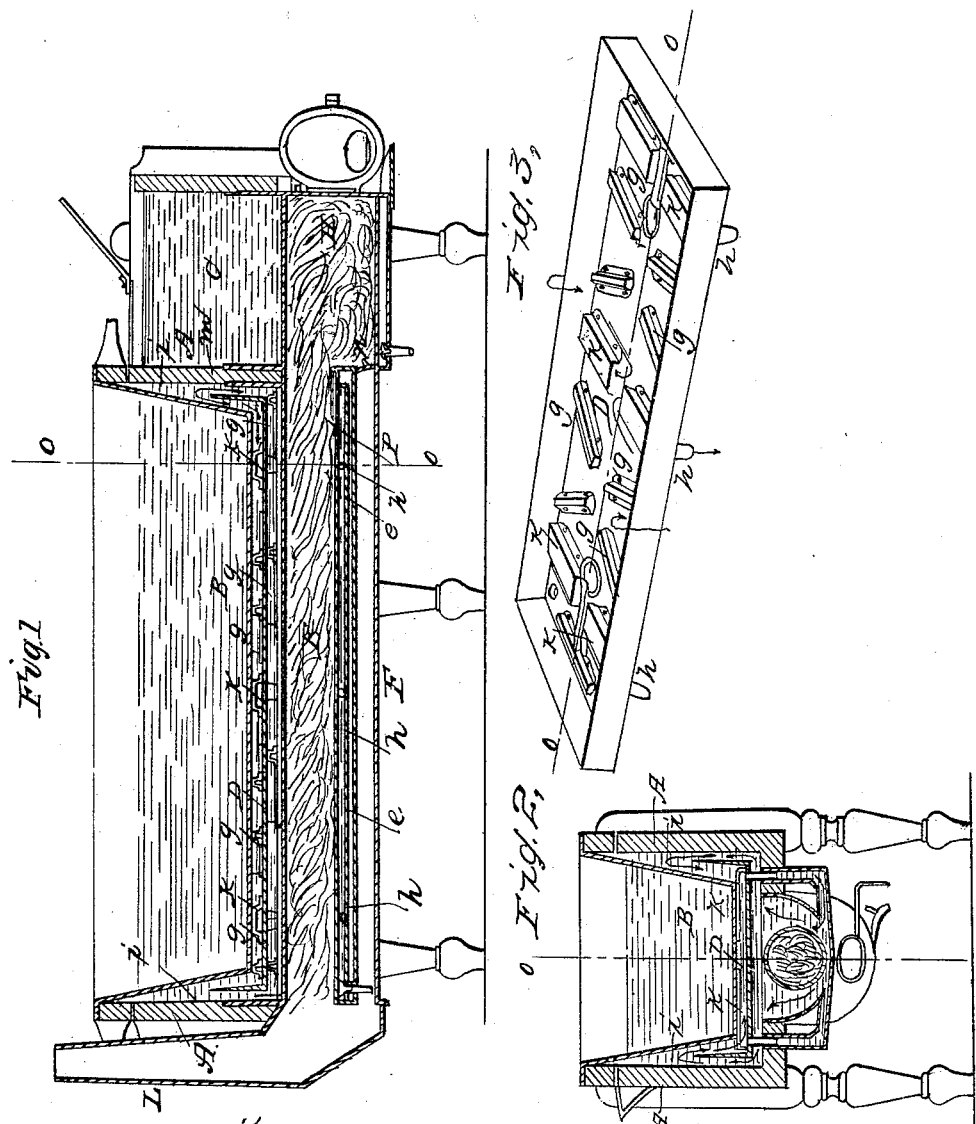

UNITED STATES PATENT OFFICE.

WILLIAM RALPH, OF UTICA, NEW YORK.

IMPROVEMENT IN CHEESE-VATS.

Specification forming part of Letters Patent No. 45,076, dated November 15, 1864.

*To all whom it may concern:*

Be it known that I, WILLIAM RALPH, of the city of Utica, in the county of Oneida and State of New York, have invented new and useful Improvements in Cheese-Vats; and I do hereby declare that the following is a full, clear, and exact description of the construction and operation of the same, reference being had to the annexed drawings, making a part of this specification, in which—

Figure 1 is a longitudinal vertical section of my invention, taken in the line *o o*, Fig. 2, and in the line *o o* in the perspective, Fig. 3. Fig. 2 is a transverse vertical section of the same, taken in line *o o*, Fig. 1. Fig. 3 is a perspective drawing of a part of said invention—to wit, the false bottom, partition, or diaphragm, separately shown for the purpose of more clearly showing the construction of the same and the supports of the inner vat thereto attached, similar letters indicating the same parts in the different figures.

The object of this invention is to secure the means whereby a quantity of hot water may be obtained in the early stages of the process of making cheese, and at all times thereafter during the process, which shall be heated in the tank or reservoir C, Fig. 1, and by the same fire used in imparting heat to the milk, or the whey and curd contained in the inner vat, B, Figs. 1 and 2, and which water in heating need not necessarily be intermixed or commingled with the water in the water-space *i*, between the outer vat, A, and inner vat, B, thereby insuring its greater purity.

The invention has for its further object the more perfect heating of the milk and scalding or cooking of the curd, whereby the curd shall be more uniformly cooked, and the quality of the cheese thereby improved, and its quantity increased by reason of the lessened amount of agitation thereof required to secure its being uniformly cooked, and the consequent lessened amount of abrasion of the particles of curd, and their reduction by reason thereof to a milky state; a further object being to guard the bottom of the inner vat from an excess of heat by distributing the currents of water first around the sides and ends of the inner vat, a portion of heat being thereby imparted to such parts. The currents of heated water, at diminished temperatures, are from thence conducted under the bottom of the inner vat, thereby tending to lessen the "baking" or congealing of the curd at the bottom of the mass, and facilitating the cooking of such parts thereof as shall be at the top.

A further object of the invention is providing supports for the inner vat of heat-conducting substances, so constructed that the water or other liquid used as medium of heat to the milk or curd shall be unobstructed in its circulation and the proper temperature more perfectly imparted to the contents of the inner vat.

To enable those skilled in the art to fully understand and construct my invention, I will proceed to describe it.

A represents the outer vat or box, rectangular in shape, and is supported at a proper height by legs. To this vat is attached at its bottom, and extending the whole length thereof, a heating flue or cylinder, E. This cylinder is placed within a case, *e*, Fig. 2. The case represents a half-cylinder, the heater being so placed within it as to leave a water-space around such cylinder the whole length of the vat. Connected with the outer vat, and opening at one end into the bottom thereof, and at the other end into the bottom of the case *e*, are the pipes *h h h*, Figs. 1 and 2. Within the outer vat, and resting on its bottom, are the hollow supports *g g g*, constructed of sheet metal, the ends of which supports are shown in Fig. 1. Upon these supports rests the false bottom, Fig. 3. This is constructed of wood or some other heat-non-conducting substance, and is made tight, except the passages through the tubes *h h h*, communicating with the tubes *h h h*, (shown clearly at *h h*, Fig. 2.) The sides and ends of the false bottom extend upward into the space *i* between the outer and inner vat, a recess being left all around it and the sides and ends of the outer vat. The inner vat, B, is constructed of sheet metal, corresponding in shape to that of the outer vat, except that it decreases in size gradually from the top to the bottom. The vat B rests upon the hollow supports *g* and flat tubes *k*, (shown clearly in Fig. 3,) and a water-space is left between it and the sides and ends of the false bottom, communicating with the space under the bottom of the inner vat. The hollow supports *g g*, Fig. 1, and *g g*, Fig. 3, are open at both ends, and the flat tubes *k k k* are open only at the end near the middle of the false bottom, constituting passages communicating with the pipes *h h h*. At one end of the outer vat, A, and a continuation thereof, is the hot-water reservoir or tank C, Fig. 1, the water in which is intended to be separated from that contained in the water-space between the outer and inner vat, above described, by the partition *m*, Fig. 1. At the bottom of said reservoir is the fire-place H, in which the fire is made for heating the water contained in the reservoir C as well as that contained in the water-space *i*, between the outer vat, A, and the inner vat, B. The fire-place H is of similar construction to the heating cylinder or flue E and its case *e*, and the heating-cylinder of the reservoir H is connected with and communicates with the heating-cylinder of the vat below the partition *m*. Below the heater E is a flue-pipe, F. (Shown clearly in Figs. 1 and 2.) This pipe is connected with fire-place H at one end, and with the smoke-pipe L at the other end, the smoke-pipe L, Fig. 1, being connected as well with the heater E as with the flue-pipe F. Within the flue-pipe F is the damper or valve *n*, which is intended to be closed during the application of heat to the milk or curd, and turned down or opened when the water in the reservoir C is only intended to be heated. Within the heater E is also a damper or valve, P, to be used for shutting the heat from the heater E when the proper temperature has been attained in the contents of the inner vat.

The operation of the invention is as follows: Milk is put into the inner vat, B, and the space *i* and *f* is filled with water; also, the reservoir C. For the purpose of extracting the animal heat, or reducing the temperature of the milk, ice may be put into the reservoir, and the water from thence made to pass through the space *i* to the opposite end of vat A, and from thence discharged through a faucet at or near the surface of the milk. When the cheese is being made, fire is applied to the fire-place H, Fig. 1; the damper or valve P is turned down, as shown, the fire-place H thereby communicating with the heater E and smoke-pipe L, the damper *n* being closed, as shown. The water in C is thereby quickly heated and ready for the various uses of the dairy, and the water around the cylinder E and in the space *i* becomes the medium of heat to the milk contained in B, the currents of which flow in the directions indicated by the arrows—that is to say, the water, being put in motion by the heat evolved from the heater E, rises upward, the current striking the under side of the false bottom D. From thence it passes to the sides and ends of the vat, and over the sides and ends of said false bottom, in contact with the sides and ends of the inner vat, B; thence under bottom of the inner vat to the middle thereof, as indicated by the line *o o*, Fig. 3. The water, having thus imparted its heat to the milk, whey, or curd, enters the flat tubes *k k*, (shown clearly in Fig. 3,) from which it is conducted through the tubes *h h h* to the under side of the heater E, from which point it is reheated and again performs the same circuit.

Having thus described my invention, I do not claim a false bottom, partition, or diaphragm having holes or apertures through which the heated water flows upward and is thereby first directed to the bottom of the inner vat; but

What I do claim is—

1. The false bottom, partition, or diaphragm D, so constructed as to keep the water heated by the heater E from contact with the bottom of the inner vat, B, until it shall have been in contact with the sides, or the sides and ends thereof, and imparted a portion of its temperature to the same.

2. The hollow supports *g*, used in combination with the outer vat, A, inner vat, B, or the false bottom or partition D, substantially as and for the purpose described.

3. The use of one or more pipes, F, in combination with the valves or damper *n* and P, for the purpose described.

WM. RALPH.

Witnesses:
J. H. PARKER,
EDWIN RALPH.